Dec. 17, 1935.   J. E. JONES   2,024,823
VALVE
Filed May 6, 1931

INVENTOR.
John E. Jones
BY
ATTORNEYS.

Patented Dec. 17, 1935

2,024,823

UNITED STATES PATENT OFFICE 2,024,823

VALVE

John E. Jones, Springfield, Mass., assignor to Chapman Valve Manufacturing Company, Indian Orchard, Mass., a corporation of Massachusetts Application May 6, 1931, Serial No. 535,352

4 Claims. (Cl. 251—97)

This invention relates to valves, and more particularly to the mechanism for opening and closing the valve.

The principal object of the invention is the provision of positively and automatically acting means actuated, by simple rotation of the actuating member, to slightly raise the valve from its seat prior to its rotation from closed to open position. Other and further objects will be apparent from the following specification and claims.

In the accompanying drawing which illustrates one embodiment of the invention as applied to a plug cock type of valve:

Figure 2:
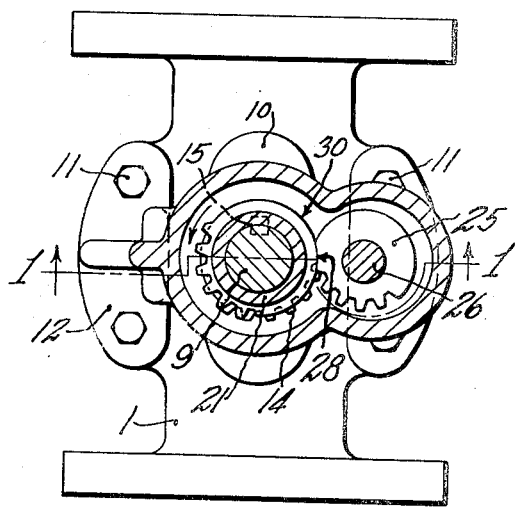
Fig. 2 is a section substantially on line 2—2 of Fig. 1, showing the parts in the position they occupy when the valve is closed and seated.

Referring to the drawing, 1 designates the valve casing which is provided with a seat 2 to receive the plug 3 having the customary aperture 4 adapted when the valve is in open position to register with the opening 5 of the valve casing. The casing 1 is provided with a cover 7 through which the stem 9 of the valve extends, the stem passing through a suitable packing, not shown, the packing follower being indicated at 10.

Figure 3:
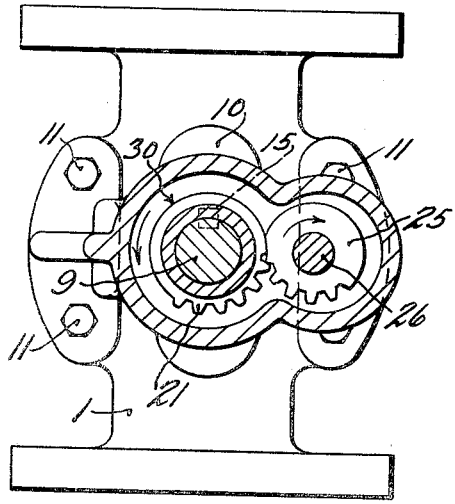
Fig. 3 is a similar view showing the parts in the position they occupy when the valve has been raised from the seat but is still in closed position.
Figure 4:
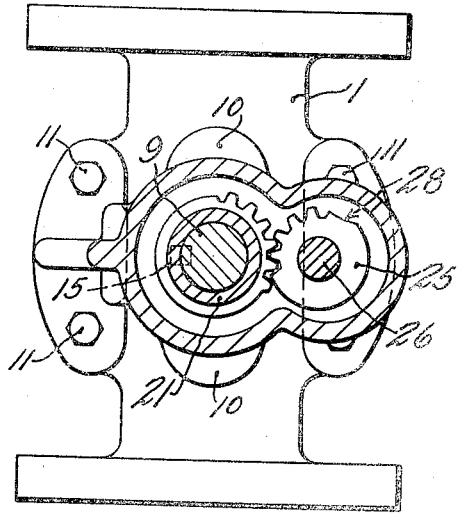
Fig. 4 is a similar view of the parts when the valve is open.

A yoke 12 is mounted on the cover and is held in place by the cover bolts 11. The valve stem 9 is provided intermediate its length with a pinion 14 keyed or otherwise secured to the stem as at 15. The outer end of stem 9 is threaded as indicated at 16 and engages in a nut 17 rotatably supported in yoke 12 and held in place by a threaded flange 19. The outer end of nut 17 is provided with an extension or hub 20, squared or otherwise shaped to receive a wrench. The inner end of nut 17 takes the form of a pinion 21. Pinions 14 and 21 may be similar in shape both being mutilated (as shown in Figs. 2, 3 and 4) to form a Geneva type of device. Pinions 14 and 21 operatively engage a pinion 25 rotatably mounted on a stub shaft 26 supported in yoke 12 and held in place as by a set screw 27. Pinion 25 is also mutilated and is provided with a curved recess 28 forming a Geneva movement and lock.

The plug may be lubricated through the hub and stem in any suitable manner, as indicated at 30.

Figure 1:
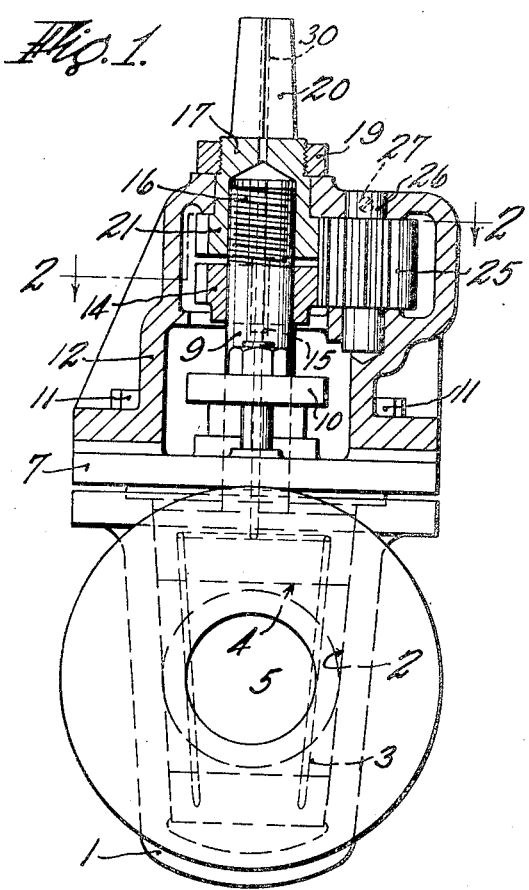
Fig. 1 is a vertical section substantially on line 1—1 of Fig. 2.

Referring to Figs. 1 and 2 with the valve plug in seated and closed position, it will be seen that the smooth portion 30 of pinion 21 is in engagement with the recess 28 of pinion 25, locking pinion 25 and thus holding pinion 14 against rotation, the latter pinion being ready to mesh with pinion 25. Rotation of pinion 21, by means of a wrench applied to hub 20, in the direction of the arrow to the position shown in Fig. 3, draws the stem upwardly into the nut 17, thus raising the plug off the valve seat. The teeth of pinions 21 and 14 are now in alignment and upon further rotation of nut 17 pinion 21 meshes with pinion 25, rotating the latter and thereby rotating the pinion 14 and stem 9 to turn plug 3 and open the valve. As shown in Fig. 4, the gears lock at the end of a quarter turn from the position of Fig. 3, preventing the plug from turning beyond open position, but a conventional lug stop may be used if desired.

In closing the valve, the action is merely reversed. Return of gears 21 and 25 from the position of Fig. 4 to that of Fig. 3 rotates pinion 14 and stem 9 to return plug 3 to closed position but still raised from its seat. Upon further reverse rotation of nut 17 and its pinion 21, the smooth portion of the latter enters recess 28, locking pinion 25 and holding stem 9 against rotation. Since stem 9 is thus locked against rotary movement, the return of nut 17 and pinion 21 to the position of Fig. 2 expels stem 9 from the nut, seating it firmly in its seat.

While I have illustrated the invention as applied to a plug cock valve, it will be understood that it may be applied to any valve or similar mechanism where it is desired to first raise and then turn one of the mating members.

It will be understood that various changes may be made in the form and arrangement of parts without departing from the scope of my invention.

What I claim is:

1. In a valve structure which includes a rotatable valve member having a threaded valve stem, a rotatable nut engaging the threads of the valve stem, means to hold the nut against axial movement, and an intermittent drive between the nut and the stem, said drive including a member rotatable with the nut and operative during a portion of the rotation of the nut to hold the stem against rotation and means rotatable with the nut and operative during a different portion of the rotation of the nut to rotate the stem a predetermined amount.

2. In a valve structure which includes a rotatable valve member having a threaded valve stem, a rotatable nut engaging the threads of the valve stem, means to hold the nut against axial movement, a Geneva gear formed on the nut, a Geneva gear secured to the stem, and a Geneva pinion connecting said gears.

3. In a valve structure which includes a rotatable valve member having a threaded valve stem, a rotatable nut engaging the threads of the valve stem, means to hold the nut against axial movement and a mutilated gear train between the nut and the valve stem, the gears of said train being provided with intermeshing cylindrical and arcuately recessed portions and intermeshing gear portions whereby the valve stem and its valve member are held against rotation during a portion of the rotary movement of the nut and are positively rotated during another portion of said rotary movement.

4. In a valve structure which includes a valve seat and a rotatable valve member fitting in said seat and having a threaded stem, a rotatable nut engaging the threads of the stem, means to hold the nut against axial movement, a gear formed on said nut and provided with a cylindrical portion and a toothed portion, a pinion having an arcuate recess within which said cylindrical portion is adapted to engage during a portion of the rotation of the nut to hold the pinion against rotation, a toothed portion on the pinion adapted to mesh with the toothed portion of said gear to cause the pinion to be driven thereby during a different portion of the rotation of the nut, and a gear secured to the stem and meshing with the pinion.

JOHN E. JONES.